United States Patent [19]

Stupek, Jr. et al.

[11] Patent Number: 6,131,118
[45] Date of Patent: Oct. 10, 2000

[54] FLEXIBLE DISPLAY OF MANAGEMENT DATA IN A PROGRAMMABLE EVENT DRIVEN PROCESSING SYSTEM

[75] Inventors: Richard A. Stupek, Jr.; William D. Justice, Jr.; James A. Rozzi, all of Harris Country, Tex.

[73] Assignee: Compaq Computer Corporation, Houston, Tex.

[21] Appl. No.: 09/111,042

[22] Filed: Jul. 7, 1998

[51] Int. Cl.[7] .................................................. G06F 15/173
[52] U.S. Cl. ........................................ 709/223; 709/224
[58] Field of Search .................................. 709/223, 224, 709/225, 226, 217

[56] References Cited

U.S. PATENT DOCUMENTS

| | | | |
|---|---|---|---|
| 4,975,829 | 12/1990 | Clarey et al. | 364/200 |
| 5,430,845 | 7/1995 | Rimmer et al. | 395/275 |
| 5,475,836 | 12/1995 | Harris et al. | 395/600 |
| 5,522,042 | 5/1996 | Fee et al. | 395/200.01 |
| 5,559,958 | 9/1996 | Farrand et al. | 395/183.03 |
| 5,561,769 | 10/1996 | Kumar et al. | 395/200.05 |
| 5,572,195 | 11/1996 | Heller et al. | 340/825.35 |
| 5,581,478 | 12/1996 | Cruse et al. | 364/505 |
| 5,608,907 | 3/1997 | Fehskens et al. | 395/672 |
| 5,887,139 | 3/1999 | Madison, Jr. et al. | 709/223 |
| 5,931,911 | 8/1999 | Remy et al. | 709/223 |
| 5,954,798 | 9/1999 | Shelton et al. | 709/224 |
| 5,958,008 | 9/1999 | Pogrebisky et al. | 709/223 |
| 5,961,601 | 10/1999 | Iyengar | 709/229 |

OTHER PUBLICATIONS

Muralidharan, Baktha; IEEE Journal on Selected Areas in Communications; vol. 11, No. 9; Dec. 1993; pp. 1336–1345.

*Primary Examiner*—Zarni Maung
*Attorney, Agent, or Firm*—Akin, Gump, Strauss, Hauer & Feld, LLP

[57] ABSTRACT

A management server for a network that facilitates and performs programmable event driven processing including event detection logic that receives and processes any of a plurality of event notifications transmitted via the network and that invokes at least one corresponding construction. Each event notification corresponds to the occurrence of management events and supports registration of listeners of each management event. The management server further includes executable components that each performs a basic function and a construction editor that enables access of the plurality of executable components. The construction editor facilitates defining a relationship between the executable components to generate constructions and performs registration of the constructions with the event detection logic as a listener of management events. Each construction, when invoked, executes its components according to the defined relationship to perform at least one desired management operation.

19 Claims, 10 Drawing Sheets

FLEXIBLE DISPLAY OF MANAGEMENT DATA IN A PROGRAMMABLE EVENT DRIVEN PROCESSING SYSTEM

A portion of the disclosure of the patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to network management, and more particularly to a programmable event driven processing system.

DESCRIPTION OF THE RELATED ART

In computer network environments, it is advantageous to manage the various software and hardware components coupled to the network from a central location or from a remote location, such as the system manager's office. Such central or remote management of a network is commonly accomplished using industry standard protocols, such as the Simple Network Management Protocol (SNMP) or the Desktop Management Interface (DMI). SNMP provides a reliable and well-known mechanism for remotely controlling network devices. However, SNMP requires the use of specialized management consoles. These consoles are typically expensive and are generally restricted to only those situations where the cost and training can be justified. DMI is a proprietary system that is deficient for similar reasons.

There is an industry-wide trend for considering network management across a network using Internet technology such as the World Wide Web (WWW), which is an Internet technology that is layered on top of the basic Transmission Control Protocol/Internet Protocol (TCP/IP) services. Other Internet technology concepts include the HyperText Transfer Protocol (HTTP), the Universal Resource Locator (URL), and the HyperText Markup Language (HTML). Such technologies are widespread and use of the various Internet protocols is growing. However, such technologies were not designed for purposes of network management and suffer from many deficiencies. For example, although HTML is the most commonly used language for writing web pages displayed by a browser, HTML is relatively static and is generally considered to lack the flexibility and programmability required for network management. Further, when SNMP and DMI communication protocols are used in existing systems, the user is limited to a fixed system. The systems cannot be flexibly programmed and are not designed for communication of management commands across an intranet or the Internet.

It is desirable to provide remote network management across an intranet or the Internet using a web browser while keeping at least the functionality and flexibility of SNMP or DMI. It is also desired to provide flexibility in the display of management data.

SUMMARY OF THE INVENTION

A management server for a network that facilitates and performs programmable event driven processing according to the present invention includes event detection logic that receives and processes any of a plurality of event notifications transmitted via the network and that invokes at least one corresponding construction. Each event notification corresponds to the occurrence of one or more management automation events and supports registration of one or more listeners of each management event. The management server further includes one or more executable components that each perform a basic function and a construction editor that enables access of the plurality of executable components to facilitate generation of one or more constructions. The construction editor facilitates defining a relationship between the executable components, if more than one is included. Each construction, when invoked, executes its components to perform at least one desired management operation. The components are executed according to the defined relationships if more than one is included.

The event detection logic of the management server may include interconnection logic that enables registration of internal and external events including the management events. For example, the plurality of constructions may be defined to include a first construction that generates an internal event when invoked and a second construction registered with the interconnection logic as a listener of the internal event generated by the first construction. It should be noted that the interconnection logic invokes the second construction in response to the internal event generated by the first construction.

Each construction may include interconnection data that incorporates the relationship between two or more instances of the plurality of executable components and a dispatcher that facilitates execution of the executable components according to the interconnection data. For example, the executable components may include a first, second and third executable components where the first component generates a boolean result or output value. The dispatcher selects either one of the second and third executable components to be executed based on the output value of the first component. Further, the first executable component may generate at least one output parameter, where each component includes at least one input parameter. The dispatcher copies one or more output parameter(s) of the first executable component to one or more of the input parameter(s) of the selected one of the second and third executable components. The construction of the management server may also include an event listener proxy, where one or more of the executable components registers with the event listener proxy as a listener of one or more events. In this case, the event listener proxy registers with the event detection logic as a listener of one or more events to serve as a proxy for the components of the construction.

The construction editor may comprise an interactive tool to enable a user to interactively retrieve instances of any of the plurality of executable components and to define interconnections and relationships between the retrieved instances of the plurality of executable components. Also, each of the plurality of event notifications may comprise an event message for transmission via the network, where the event message includes an Event IDentifier and event properties.

In yet another embodiment, the event detection logic of the management server includes interconnection logic, a server interface that interfaces with the network according to Transmission Control Protocol/Internet Protocol (TCP/IP), and an event handler that routes event notifications received by the server interface to the interconnection logic.

A management system according to the present invention includes a management server as previously described and at least one managed device that detects occurrence of any one of a plurality of management events occurring on that device and that transmits one or more of a corresponding plurality of event notifications via the network. The event detection logic of the management server may include interconnection logic, a server interface for interfacing with the network, and a server event handler that routes event notifications received by the server interface to the interconnection logic. In addition, a client system may be included and coupled to the network that generates a request event. At least one construction is registered with the interconnect logic to listen for the request event and is implemented to generate a reply event in response to the request event when received. The server event handler receives and routes the request event to the interconnect logic and receives and transmits the reply event to the client system via the server interface.

Still further, the client system may log onto the management server and receive a session identifier, where the client system includes the session identifier in the request event. The management server provides the client system the session identifier, and the server interface uses the session identifier in the request event to respond to the client system when transmitting the reply event. Advantageously, the client system and the server interface of the management server may operate according to TCP/IP. For synchronous operation, the client system transmits the request event to the management server as an HTTP post transaction, and the server interface submits the reply event as a response to the HTTP post transaction. For asynchronous operation, the client system may transmit the request event to the management server as an initial transaction and then periodically transmits a query to the management server to poll for the reply event. In this case, the server interface responds to the initial transaction and each query with no data and eventually responds to the request event by providing the reply event in response to one of the queries. Again, the client system and the server interface of the management server may operate according to TCP/IP, where each query is transmitted as HTTP get transaction and where the server interface submits the reply event as a response to one of the HTTP get transactions.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
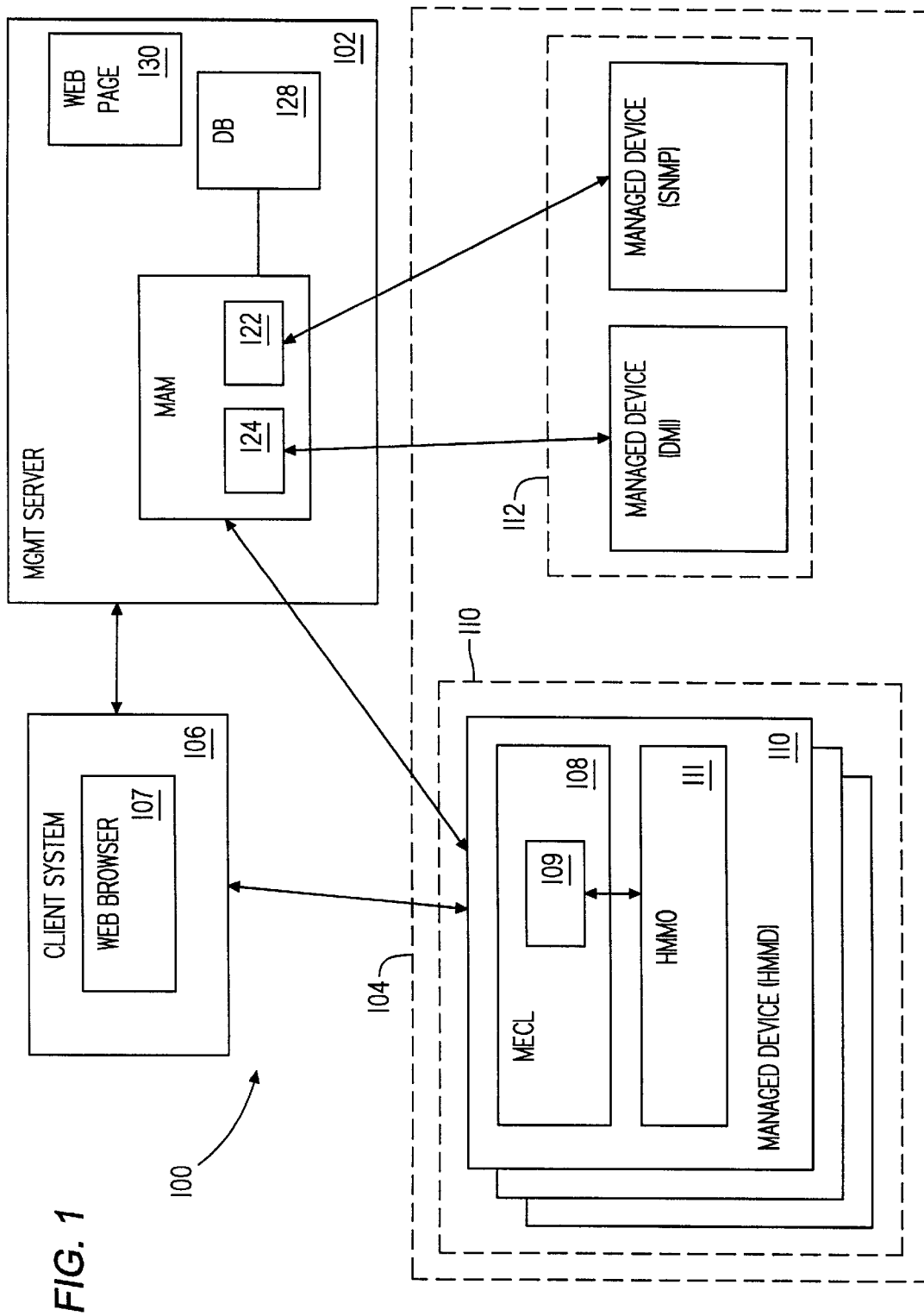
FIG. 1 is a block diagram of a web-based management network according to the present invention.

Referring now to FIG. 1, a block diagram of a web-based management network 100 is shown. A management system according to the present invention, such as the management network 100, enables management of both hardware and software components over a network using Internet technology. The management network 100 includes a management server 102, one or more managed elements (including devices, systems, etc.) 104, and a client system 106 that are coupled together using any one or more network architectures or technologies, such as Ethernet®, Asynchronous Transfer Mode (ATM), Token Ring, etc. The management network 100 preferably supports the World Wide Web (WWW), which is an Internet technology that is layered on top of the basic Transmission Control Protocol/Internet Protocol (TCP/IP) services. The management network 100 may be any type of network or network topology such as a separate intranet, part of the Internet itself, an intranet with access via a gateway or firewall to the Internet, etc.

The managed elements 104 generally include computer systems, such as desktops, portables, personal computer systems (PCs), servers, workstations, etc. as well as other networking devices, such as switches, repeaters, hubs, network interface cards (NICs), etc. The managed elements 104 are generally divided into two different types, including web-enabled devices or Hyper-Media Managed Devices (HMMDs) 110 and legacy devices 112. The legacy devices 112 include those devices implemented with the Simple Network Management Protocol (SNMP), the Desktop Management Interface (DMI), or similar type management systems known to those skilled in the art.

The HMMDs 110 each include one or more management agents called Hyper-Media Managed Objects (HMMO) 111. In the preferred embodiment, the HMMDs 110 each convert management data into a form that may be browsed using Internet technology, which may incorporate TCP/IP, Universal Resource Locator (URL), HyperText Transfer Protocol (HTTP), HyperText Markup Language (HTML), Java™, JavaScript, etc. A managed element communication layer (MECL) 108 including one or more servers 109 is provided at the front end of the HMMOs 111 for providing security of and access to management data of the corresponding HMMD 110. The servers 109 preferably operate as HTTP servers, and a separate server 109 is loaded and operated within the MECL 108 for each installed HMMO 111.

The client system 106 supports TCP/IP and includes a web browser 107 for accessing and displaying management information from the management server 102 or any of the HMMDs 110. Examples of web browsers include MicroSoft® Internet Explorer for Windows 95® or Windows NT® and Netscape Navigator™ for Windows 95®, Windows NT® or HP/UX by Hewlett Packard. Other web browsers are contemplated as well. It is desired that the web browser 107 support a scripting language, such as JavaScript or the like. Scripting language includes instructions interpreted by the web browser 107 to perform certain functions, such as how to display data. The client system 106 generally replaces the management console of an SNMP management system, providing access to either the HMMDs 110 or the management server 102.

The management server 102 preferably uses an appropriate operating system (OS) such as Windows NT® or the like. The management server 102 also executes or otherwise operates as a Hyper-Media Management Application (HMMA) that provides management services for all of the managed elements 104 including the HMMDs 110 and the legacy devices 112. The management server 102 is the aggregation point for all management information of the management network 100 and provides a unified data model, in which data from the legacy devices 112 (SNMP, DMI, etc.) and data from the HMMDs 110 are consolidated into a common form. As such, the system and network management is unified and allows for easier integration and navigation between applications.

The management server 102 accesses management data from the HMMDs 110 and controls those devices using Internet technology. The HMMOs 111 operate as self-describing web agents that use common web-enabling components to provide registration, discovery, security and HTTP communications. The HMMO web agents render information in HTML, or in scripting language, or a combination of both, for viewing by the web browser 107 on the client system 106. The information may also be sent directly to the management server 102. The management server 102 also converts data from the legacy devices 112 into a form that may be browsed. For example, the management server 102 includes an SNMP converter 122 that converts SNMP-based data from SNMP managed devices to HTML, and a DMI converter 124 that converts DMI-based data from DMI managed devices to HTML. The management data from the managed elements 104 is stored in a management database 128 maintained on the management server 102. The SNMP converter 122 and the DMI converter 124 are examples of management applications 126, which are plug-in modules used to perform the functions or otherwise expand the capabilities of the management server 102. In this manner, the management server 102 is adaptable and flexible depending upon specific embodiment needs. The management server 102 also generates a home page 130 accessible by any appropriate web browser, such as the web browser 107 executing on the client system 106 or a browser on the management server 102 itself.

The management server 102 provides a management foundation, which includes discovery of manageable devices, performance of event management and determination of device status and device groups. The database 128 preferably includes events, discovered devices, device status, user preferences and user-specified data that is actively monitored. The management server 102 performs management services to discover managed elements 104 of the management network 100 and to track the device state of all of the managed elements 104. The management server 102 discovers devices on the network using IP pinging for IP devices, SAP broadcasts for Internetwork Packet Exchange (IPX) devices and is extendible to enable other discovery mechanisms. The management server 102 periodically collects and saves configuration information in the database 128 in a common form regardless of whether the information was originally web-based, SNMP or DMI. For example, the management server 102 stores events and traps, and enables configuration of filters that ultimately generate queries that are used to select records from the database 128.

The management server 102 also enables access of the database 128. The database 128 is preferably based on SQL Server by Microsoft® and is accessed via Java™ DataBase Connectivity (JDBC) or Object DataBase Connectivity (ODBC). SQL views are created to abstract the database 128 for reporting purposes.

The management server 102 enables the user to select a managed element 104 and view detailed information about that device. The management server 102 also enables a user to create device groups for business process views by filtering for selected devices and for selected events of those devices. The management server 102 handles events, such as SNMP traps and HTTP alerts, logs the events, and allows a user to set event filters.

The client system 106 includes a web browser 107 for accessing and displaying management information from the management server 102 and any of the HMMDs 110. For example, the client system 106 sends an HTTP request in URL format to an HMMD 110, which is received by the MECL 108 of that HMMD. The MECL 108 accesses an index page for the HMMD 110, or the request is transferred to one of the servers 109 for a corresponding one of the HMMOs 111. Each HMMO 111 formulates or renders a corresponding web page using HTML and/or scripting language, which is passed back to the client system 106 for rendering and display via the server 109 of the MECL 108. The client system 106 accesses the home page 130 or data from the database 128 in a similar manner using TCP/IP and another URL. The management server 102 also performs security functions.

It is noted that the legacy devices 112 are managed and controlled by the management server 102 as usual according to the particular protocol supported (SNMP, DMI), so that the client system 106 might not necessarily have direct access. Nonetheless, the client system 106 has access and control of the legacy devices 112 via the management server 102. In this manner, it is appreciated that the client system 106 may be located anywhere on the Internet to access and control all of the managed elements 104 of the management network 100.

One of the primary goals of the management network 100 is to ensure a continuous operation of the network with as little down time as possible by isolating and solving problems. The management server 102 provides the base for software modules to expose and present the solutions to problems that exist within the management network 100. The act of finding problems, reducing the complexity in analyzing or diagnosing problems, and helping to resolve problems is referred to as Action Oriented Management (AOM). AOM comprises several concepts, including discovering and defining a problem, determining the course of action(s) to take based on the problem, and providing the resolution to the problem and whether the resolution may be performed, either programmatically or as a list of steps for the user to follow.

There are many categories of actions that the management server 102 discovers. One action category is hardware fault detection, which is a category of actions identifying problems with hardware. Examples of hardware fault detection include failures or predictive failures on hard drives, processors, and memory. Most problem resolutions in the is hardware fault detection category are simply identified steps that the user must follow to correct the problem. Tools in this category allow viewing of the problem. Another action is software configuration actions, which are actions that identify potential problems with software configurations. Software configuration actions use version control functionality along with the concept of a "software set". The user establishes a set of software that should be loaded on a server, and this category of actions identifies any deviations from that set, and differences between the set and the latest software. Problem resolution for software configuration allows distribution of software updates, along with retrieval of new software. Tools in this category include software distribution, Internet download, and report generation.

Another action category is thresholds, which are actions that track situations on the network identified by combinations of data. The user has to configure the situations. The threshold tools allow the user to monitor management data and be notified whenever certain conditions arise. Another action category is action advisories, which are actions that notify the user whenever an event is needed to be performed, such as service advisories generated by the manufacturer of the management server 102. Other advisory examples include backups, disk storage cleanup, etc. Tools for this category provide the details of the action advisory and may allow corrective action. Another action category is software updates, which are actions that notify the user whenever a new software update to software on their network becomes available on a corresponding web site. Tools for this category allow the new update to be fetched from servers setup on a user's network. Another action category is traps, which are actions that occur when an SNMP trap, an HTTP event, a DMI indication, or similar type of trap or event is received. The trap is turned into an action that is operated on just as any other action. The tools in this category allow the user to forward the trap to other management consoles, to page the user, provide correlation, etc.

In general, management is often classified by what is being managed: hardware, operating system, software, etc. The following Table 1 illustrates the layers and the management data that is typical of that layer. It is noted that Table 1 is by no means exhaustive and simply provides typical management data for the corresponding layer.

TABLE 1

Management Layers and Corresponding
Typical Management Data

| Managed Layer | Examples of managed data at each layer |
|---|---|
| Applications (highest layer) (Vertical, specialized applications) Databases, web servers, So-called "Horizontal" applications | Transactions per second Application specific data, such as status of batch processing activities Table space used Number of locks set Resources used - percent of system work areas, etc. |
| Operating System | Number of processes Interrupts per second being serviced Per cent of CPU time spent in user state Names of processes |
| Hardware (lowest layer) | Configuration: serial number of disk drive, bytes of RAM installed, etc. Operational: number of bytes sent by Ethernet controller, number of packet collisions on Ethernet, temperature of CPU cabinet, etc. |

Figure 2:
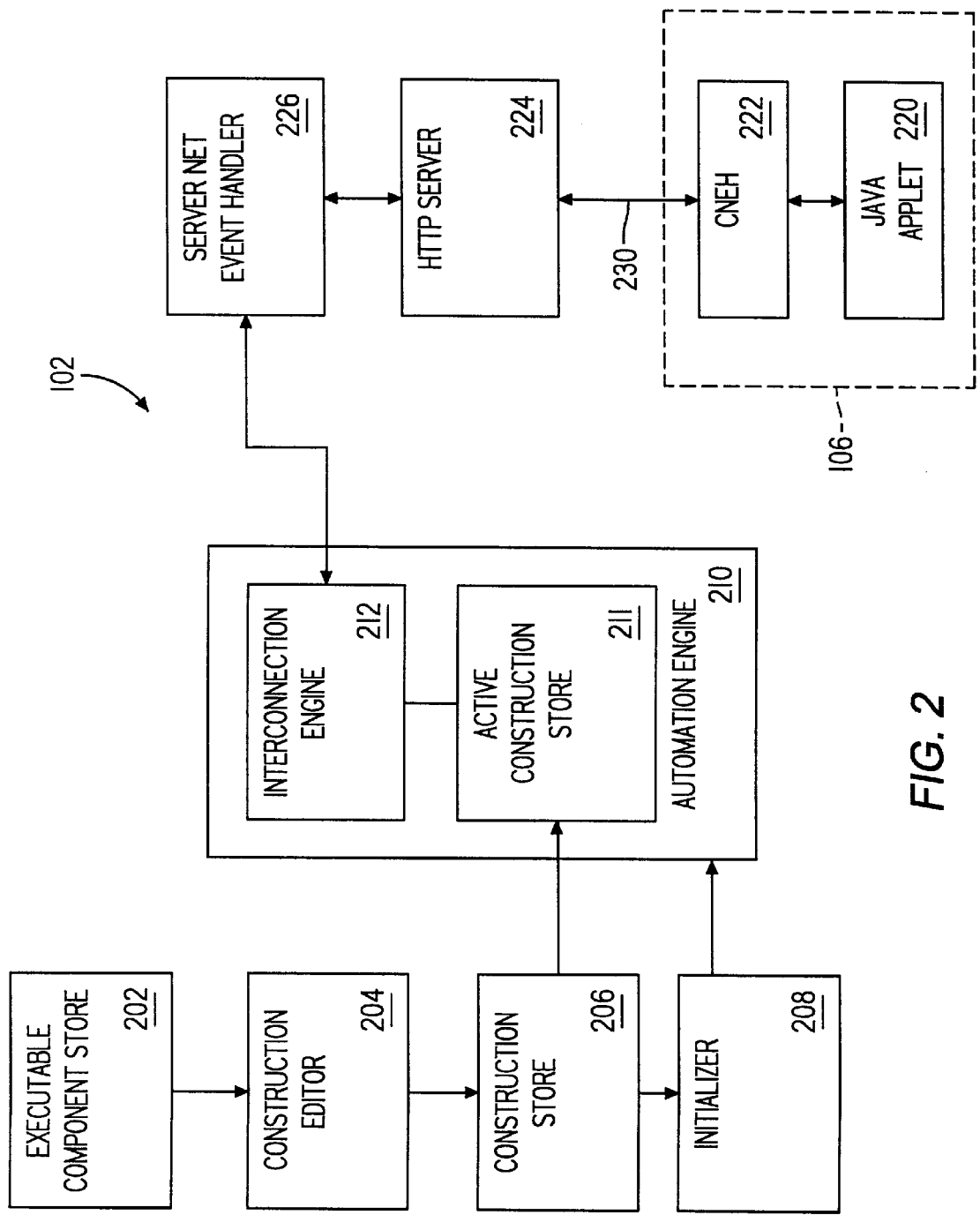
FIG. 2 is a block diagram of the management server of FIG. 1 including a programmable event driven processing system according to the present invention.

Referring now to FIG. 2, a more detailed block diagram is shown of exemplary portions of the management server 102 for performing programmable event driven management processing and as it operates in conjunction with the client system 106. The management server 102 includes an executable component store 202, a construction editor 204, a construction store 206 for permanently storing constructions, an initializer 208, and an automation engine (AE) 210. The AE 210 includes an active construction store 211 and an interconnect engine 212. The active construction store 211 is a memory such as a random access memory (RAM) or the like. An executable component is a software module that performs a basic function or arbitrary processing and that allows its input and output parameters to be discovered by another program without compiling or otherwise processing the module (i.e., "self describing"). One or more predetermined executable components are stored in the executable component library or store 202 and are accessible by a software program, such as the construction editor 204, to form collections of one or more executable components called "constructions." Once an executable component is defined and compiled, instances of the executable components are copied and used in the constructions. This provides an advantage in that executable components do not have to be recompiled to create new constructions. The construction editor 204 accesses the executable component store 202 and accepts input commands that specify and define a relationship between the executable components that constitute the construction being assembled. These commands can be supplied by a human operator, a batch command file, or any other suitable method.

Each construction is executed to perform one or more basic functions to perform a management operation. Constructions are designed to take specific actions in response to management events or "events" that occur on the network. For example, upon power up or initialization, the initializer 208 performs operations required for the execution of the AE 210 and to enable the management server 102 to begin operation. The initializer 208 loads a copy of the constructions stored in the construction store 206 into the active construction store 211 and creates an initialization event called "init event." At least one construction loaded into the active construction store 211 is registered to listen for "init event" and respondingly initializes and starts an HTTP server 224, a server net event handler (SNEH) 226, and other processes to initialize the system. Finally, the interconnect engine 212 handles the flow of all events of the management server 102 during operation.

An event is responsible for providing information about something related to the network that should be done or something network related that has happened. It is similar in concept to a windows message in Win32. The interconnect engine 212 is responsible for dispatching events that are generated to the constructions. A construction, which includes a listener of events, is made up of many executable components coupled or otherwise interfaced together to perform one management function or a portion of a management function upon receipt of an event from the interconnect engine 212.

In the embodiment shown, the client system 106 communicates with the management server 102 through a Java applet 220 and a client net event handler (CNEH) 222. The management server 102 includes the HTTP server 224 and the SNEH 226 that are communicatively coupled to the CNEH 222 of the client system 106 via a network link 230. The network link 230 may comprise or be based upon any type of network architecture or technology, such as Ethernet®, Asynchronous Transfer Mode (ATM), Token Ring, etc., and may incorporate any type of network topology such as an intranet, part of the Internet, etc. The SNEH 226 is the point at which any device, including the client system 106, communicates with the interconnect engine 212 of the management server 102 and is the access point through which the flow of all events is channeled.

Figure 3:
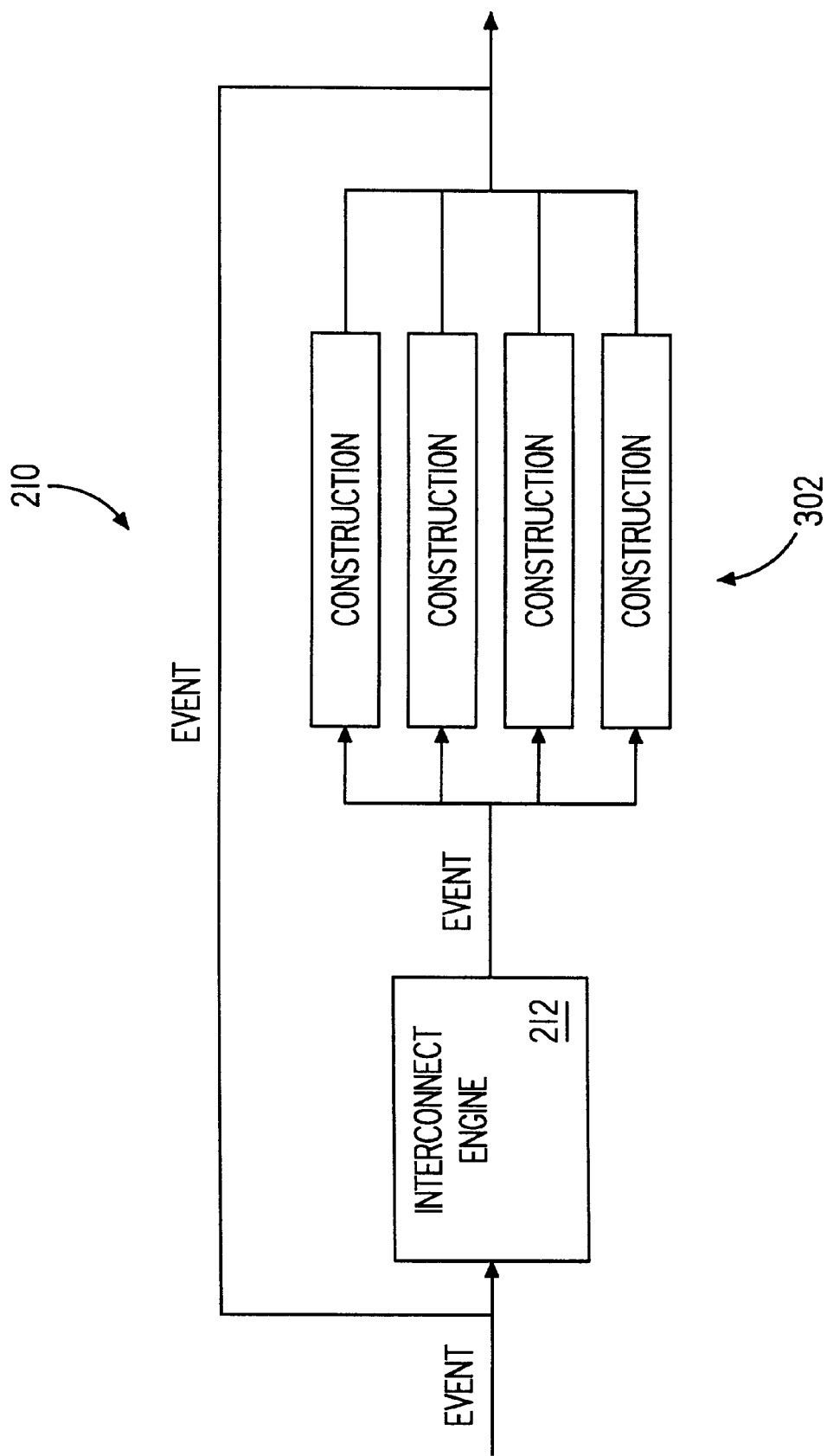
FIG. 3 is a block diagram of an exemplary automation including an engine for connecting events with a plurality of constructions in accordance with the present invention.

FIG. 3 is a block diagram of the AE 210 including the interconnect engine 212 that is responsible for connecting together events with constructions or "listeners" 302 of the events. In the embodiment of FIG. 3, the interconnect engine 212 receives an event signal or notification, either externally or from a construction 302, and relays the event to the appropriate one of the constructions 302. The interconnect engine 212 determines which construction 302 to relay the particular event to based on registration information that has been recorded in the interconnect engine 212. The interconnect engine 212 includes event detection logic for registering to receive events using interconnection logic and also passes those events to the proper constructions based on the registration information. Further, the event detection logic includes a server interface for interfacing with the network and a server event handler, coupled to the server interface and the interconnection logic, that routes event notifications received by the server interface to the interconnection logic. Thus, an event cycle is supported in which the interconnect engine 212 receives an event (either externally or internally) and then determines which destination construction(s) to send the event. Next, the construction(s) may generate an internal event and the internal event is passed back to the interconnect engine 212 to begin a new cycle. This cycle is repeated as necessary for the particular management operations of the system. The SNEH 226 registers as an event forwarder and receives events for which no listener has registered.

Such unregistered events include net events received and transmitted via the HTTP server 224.

Figure 4:
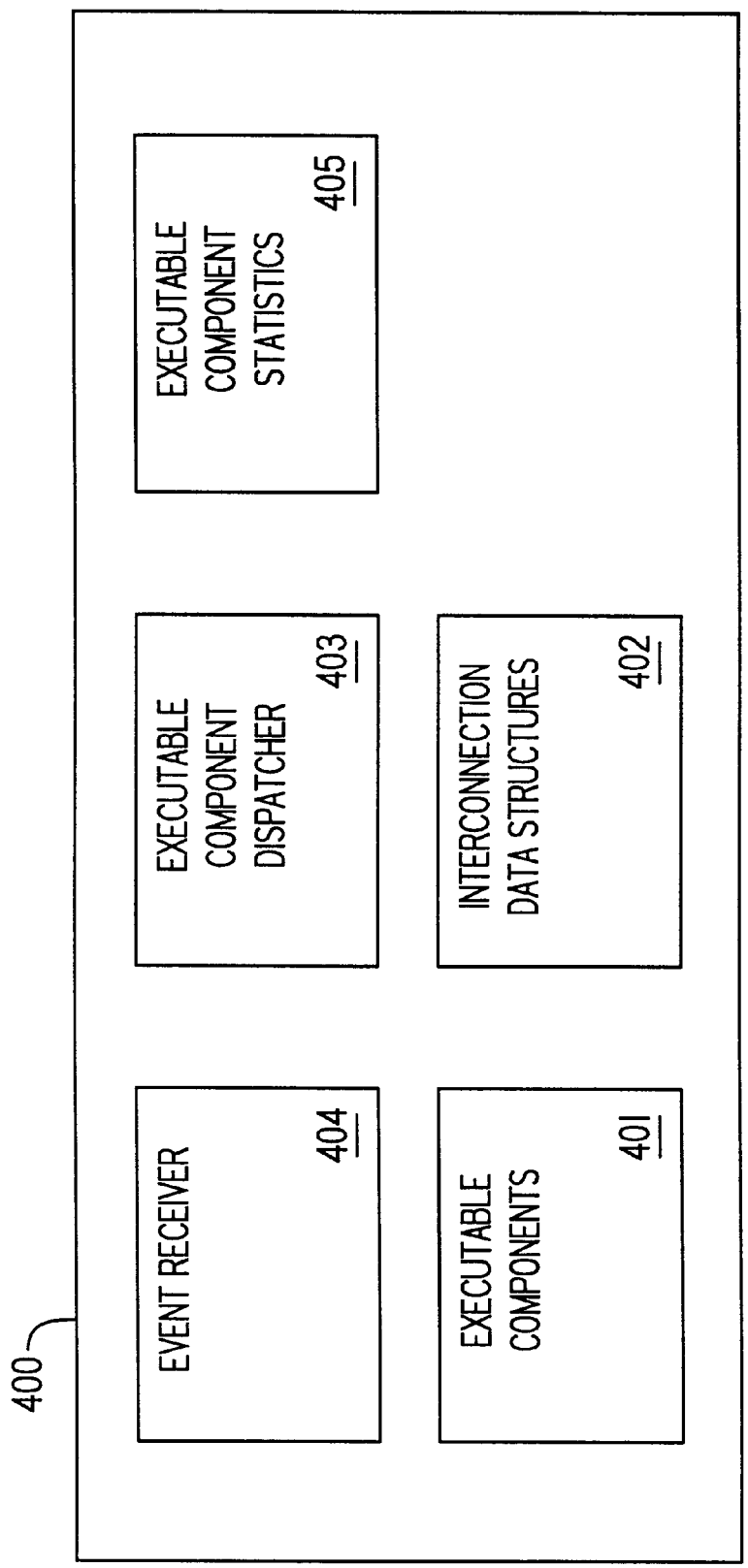
FIG. 4 is an exemplary block diagram of a construction according to the present invention.

FIG. 4 is a simplified block diagram of an exemplary construction 400 according to the present invention. The construction 400 of FIG. 4 includes, but is not limited to, one or more executable components 401, interconnection data structures 402, an executable component dispatcher 403, an event receiver (or event listener proxy) 404, and executable component statistics 405. The executable components 401 enable the construction 400 to be activated by notifying the event receiver 404 of the event parameters to monitor. One or more of the executable components 401 includes an event listener component to register with the event receiver 404 and becomes a listener for one or more specific events. The event receiver 404 serves as an event proxy for the executable components 401 by registering with the interconnect engine 212 to become a listener of the one or more specific events.

The interconnection data structures (or interconnection data) 402 describe the relationships between the executable components 401 as generated by the construction editor 204. This information is used by an executable component dispatcher 403 to control how the executable components are dispatched. The component dispatcher 403 controls operation of the construction 400 by invoking each executable component 401 and by copying parameters from one executable component to the next. The component dispatcher 403 also executes the construction 400 in a sequential manner so that if more than one event for which the construction 400 is registered occurs the component dispatcher 403 queues up the events and executes them in the order received. The executable component statistics 405 tracks and stores any or all statistics of the construction 400 that a user desires to monitor. The user may specify the desired statistics to monitor when generating the construction 400 using the construction editor 204.

Examples of statistics are as follows: When the construction last ran, how many times it has run, longest execution time, total execution time, the number of events queued for the construction, high water mark for queued events, whether the construction is running, any errors generated by the construction, etc. The event receiver 404 maintains the executable component statistics. Additionally, it monitors how often the construction runs. If the construction is idle for a period of time greater than a preset amount, the event receiver 404 has the ability to unload construction elements 402, 403, and 401 from memory and preserve their state. This conserves memory when a construction is not in active use, although the event receiver 404 remains active. When it receives an event, it reloads the construction elements 402, 403, and 401 and restores their state such that they can commence processing the event.

Figure 5:
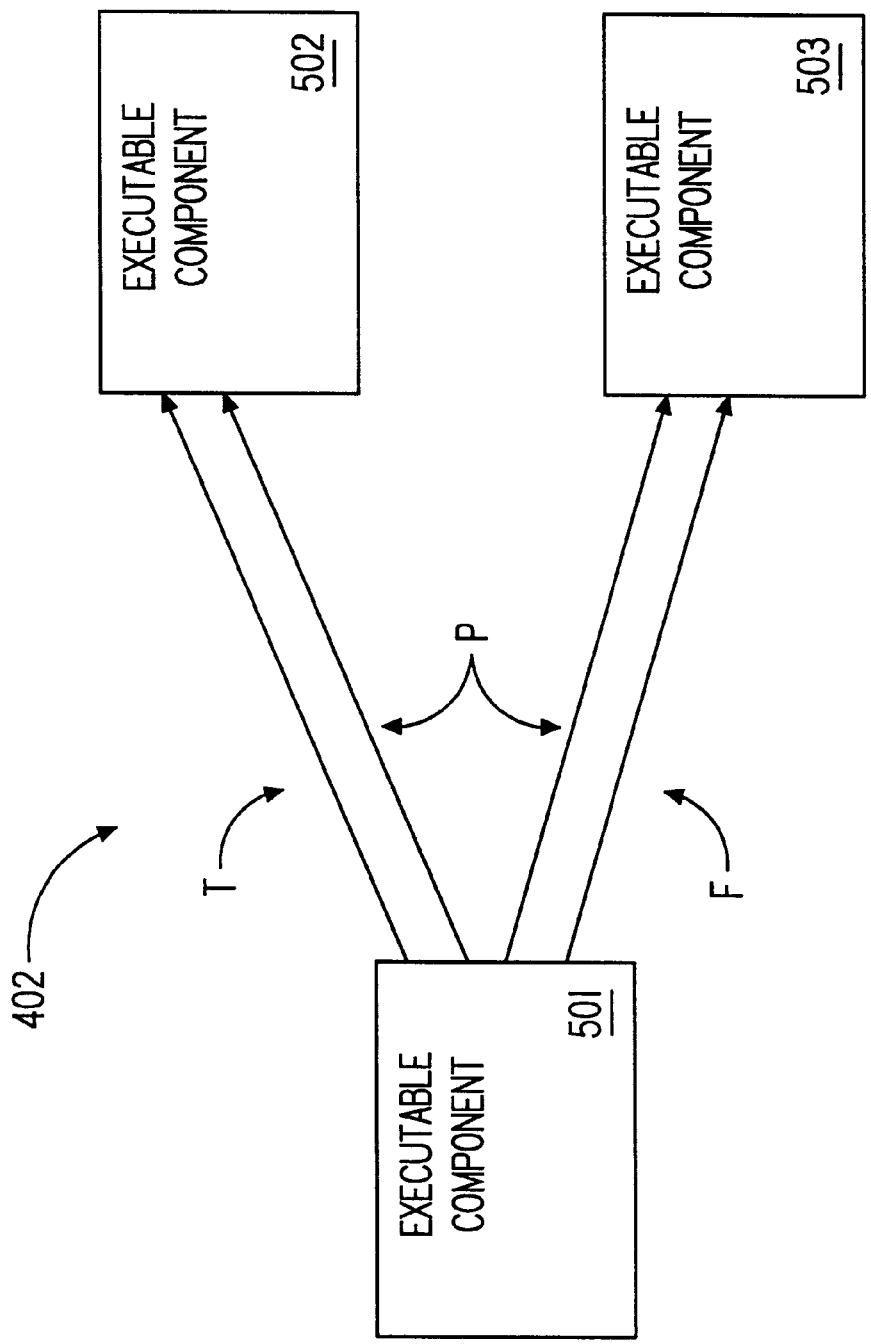
FIG. 5 is an exemplary block diagram of interconnection data structures defining relationships between components of a construction according to the present invention.

FIG. 5 is an exemplary block diagram of exemplary relationships between executable components 401 according to the present invention as would be stored in the interconnection data structures 402. These data structures specify the sequencing and relationships between the executable components 401. The executable component dispatcher 403 controls how the executable components 401 are dispatched. The embodiment shown in FIG. 5 illustrates the relationships between three executable components 501, 502 and 503. During operation, the executable component dispatcher 403 invokes a determineOutputState method 610 (FIG. 6) for generating an output value and at least one output parameter of an executable component, such as any of the executable components 501, 502, and 503. In the embodiment shown, the output value is Boolean. The executable component dispatcher 403 uses the output value and the interconnection data structures 402 to identify one or more subsequent components to be executed. In particular, the executable component dispatcher 403 copies output parameters from one executable component to the input parameters of a next executable component indicated by the output result. For example, if the output value of the executable component 501 is true (T), the executable component dispatcher 403 copies the output parameters (P) of the executable component 501 to the input parameters of the executable component 502. The specific parameters to be copied are specified through the construction editor 204 and the relationships stored in the interconnection data structures 402. The relationships may be but are not necessarily one-to-one. For example, the second output parameter of executable component 501 may be copied to the first input parameter of executable component 502 or the executable component 502 inputs a subset of the output parameters supplied by the executable component 501. There is no restriction on the order of the copied parameters or on the number of parameters that are copied nor on the target executable component. The target executable component depends upon the output value. In the case of executable component 501, if the output value of the determineOutputState method 610 is false (F), the executable component 503 is invoked next. In this case, the executable component dispatcher 403 copies the output parameters (P) of the executable component 501 to the input parameters of the executable component 503 and invokes the executable component 503 instead of the executable component 502.

As a simple example, the steps used by the automation engine (AE) 210 are as follows: an event occurs; all listeners of or those that have registered to listen to the event are delivered the event in the form of an event notification or event message; a construction receives the event notification and activates itself; the AE 210 fetches the first executable component within the construction; any parameters external to the executable component are delivered to the executable component from the executable component that is sourcing the parameters; the determineOutputState method of the executable component is called to cause the executable component to perform its operation; and the output value is used to determine which executable component to move to next. This process is then repeated beginning with delivering parameters between consecutive executable components.

Figure 6:
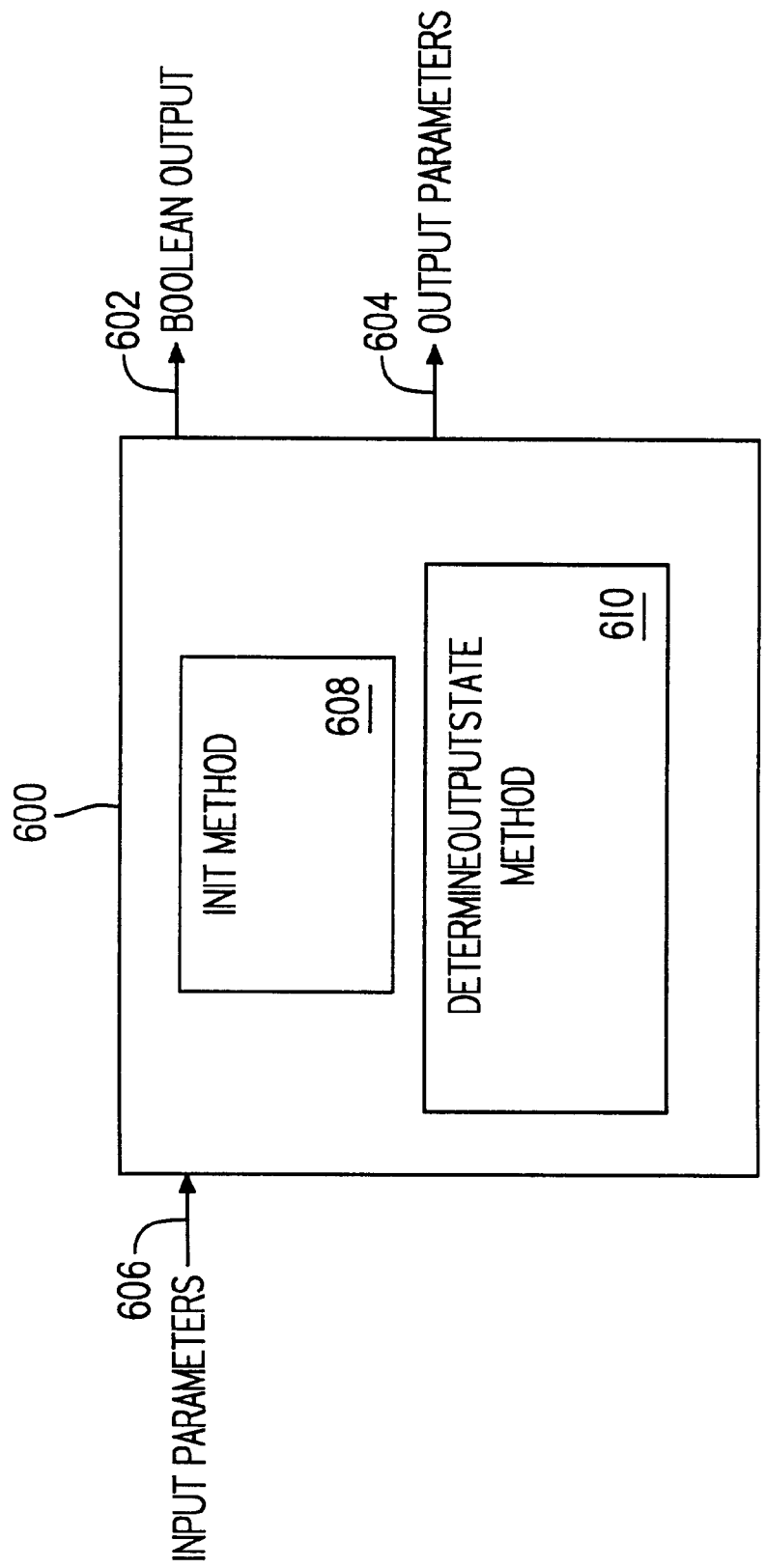
FIG. 6 is a block diagram illustrating an exemplary executable component according to the present invention.

FIG. 6 is a block diagram illustrating an exemplary executable component 600. The executable component 600 includes an init method module 608. When loaded, the init method module 608 initializes the state of the executable component 600, including setting initial values for any input and output parameters. The executable component 600 also includes a self describing software module called the DetermineOutputState method 610 that performs the primary processing of the executable component 600 and which may comprise any type of arbitrary processing to perform a desired basic function. The DetermineOutputState method 610 allows its input and output parameters to be discovered by another program without compiling or otherwise processing the module. The executable component 600 typically has a boolean output 602 which indicates the result of its processing and has zero or more output parameters 604 and zero or more input parameters 606.

Figure 7:
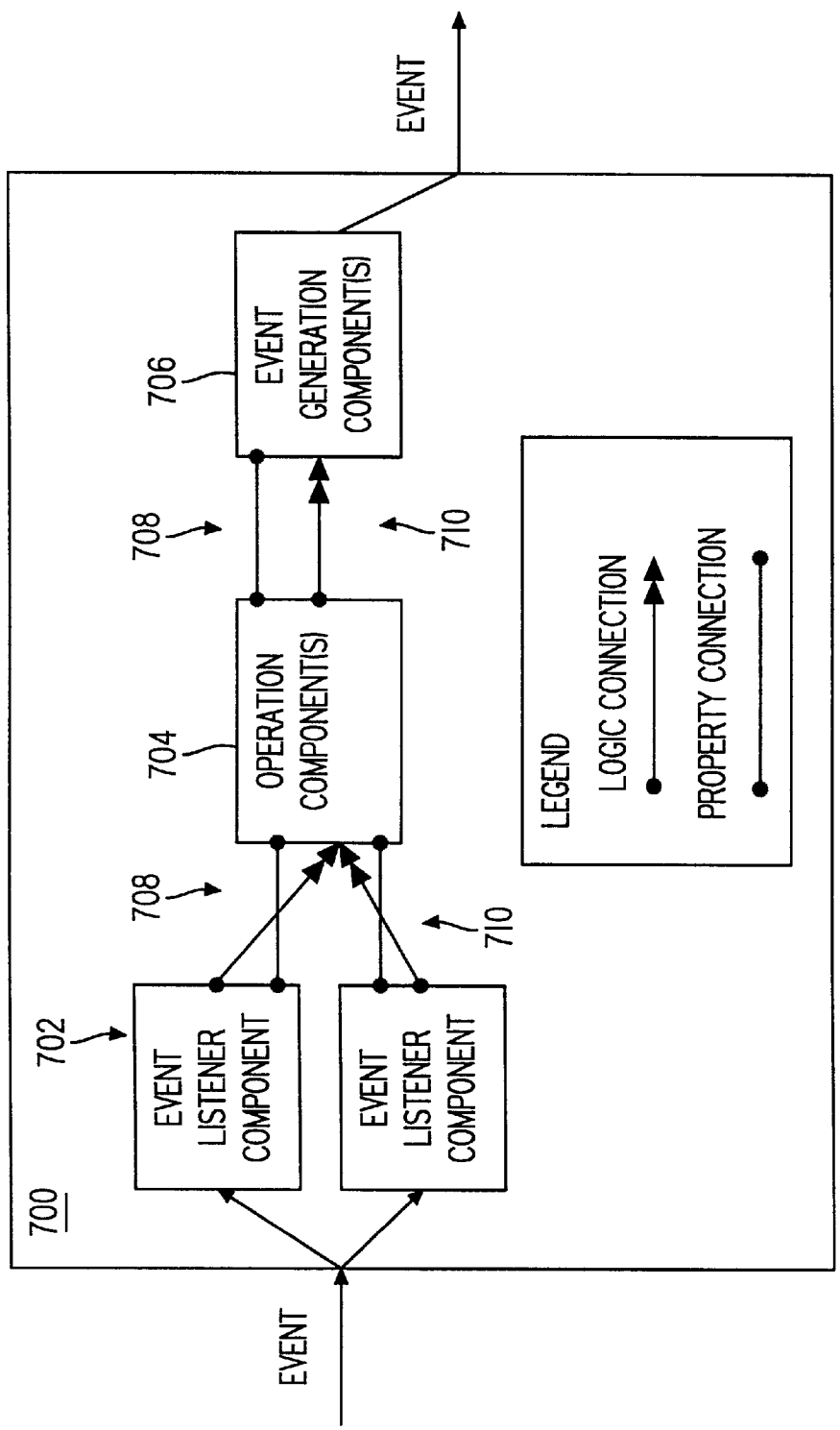
FIG. 7 is a block diagram illustrating operation of a construction editor for building a construction and programming the relationships between a construction and its operation component(s) according to the present invention.

FIG. 7 is a block diagram illustrating operation of the construction editor 204 for building one or more constructions. A construction 700 represents one management operation and includes all of the executable components and linkages between executable components that are necessary to perform the operation. The executable components 401 may include one or more event listener component(s) 702 that activate the construction, one or more operation component(s) 704 that make up the heart of the construction's functionality, and one or more optional event generation component(s) 706. The interconnection data structures 402 may include both property connections 708 and logic connections 710 that define the relationship between the executable components and that identify how to move between components based upon the output values. In order to build a construction, the construction editor 204 is commonly engaged. The construction editor 204 comprises an interactive tool that typically contains a tool palette with all of the available executable components from the executable component store 202 and allows selected executable components to be added to a construction. Although the executable components of FIG. 7 only include the event listener component(s) 702, the operation component(s) 704, and the event generation component(s) 706, additional types of executable components are contemplated.

Figure 7A:
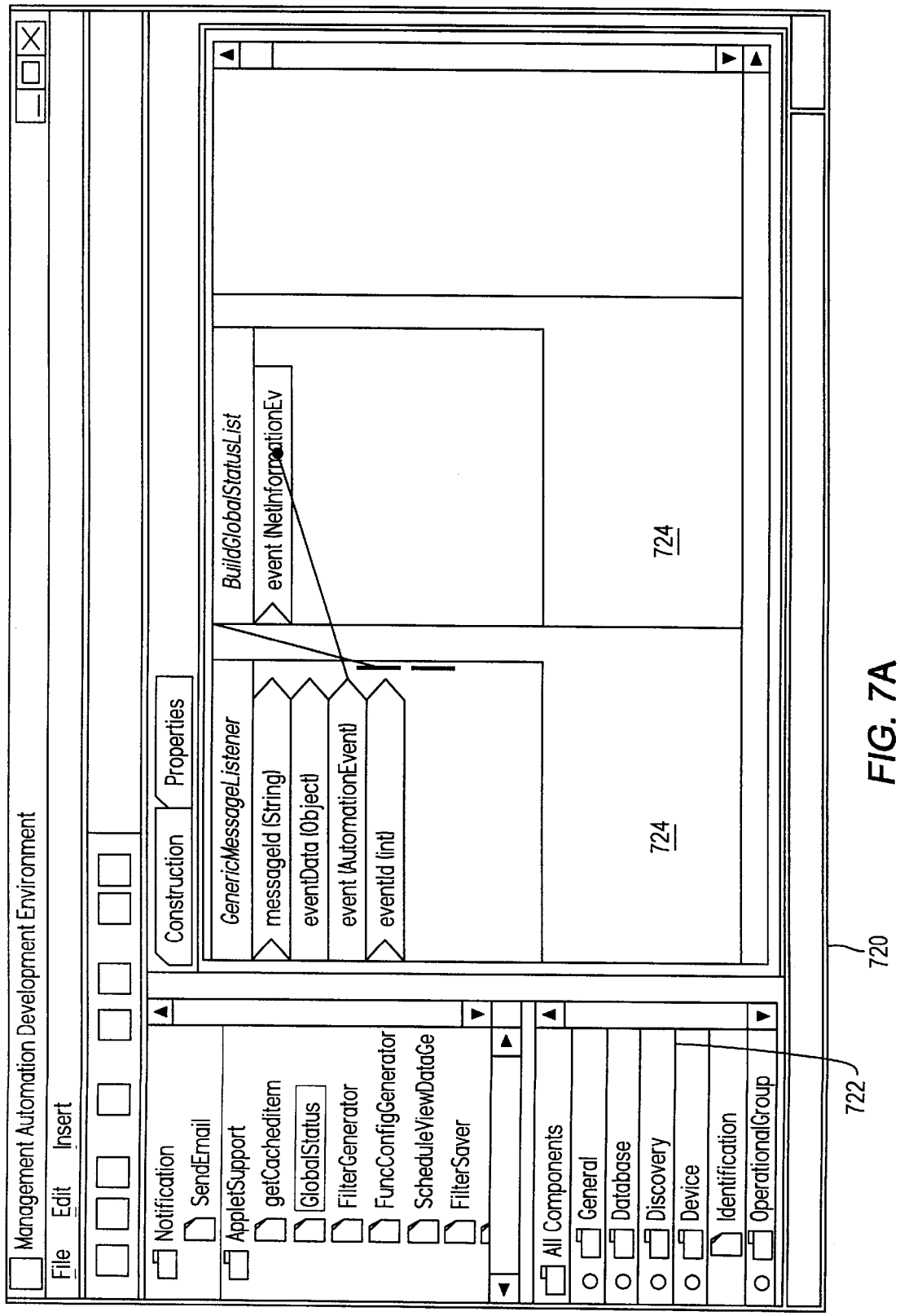
FIG. 7A is an exemplary computer screen shot of an exemplary construction editor according to the present invention.

FIG. 7A is an exemplary diagram of a screen shot 720 as it would appear on a computer display device when a user accesses the construction editor 204, which operates with a graphic user interface (GUI). The user manipulates one or more input devices, e.g., a mouse, a trackball, a keyboard, etc. (not shown), to select one or more executable components and to define the relationships using the property connections 708 and the logic connections 710. The screen shot 720 includes a list of components 722 from which the user selects using the available input devices. For example, the user selects one of the list of components 722 and places the selected component into a work area 724. The user then defines relationships between the selected components using property connections 708 and logic connections 710. Of course, the screen shot 720 shown in FIG. 7A is only exemplary and would be modified according to the web browser 107 and/or the operating system of the particular embodiment. Thus, the construction editor 204 provides the user with the ability to manipulate operations performed by or on the management server 102 from a remote or central location and across the Internet, an intranet, or other network topology.

Figure 8:
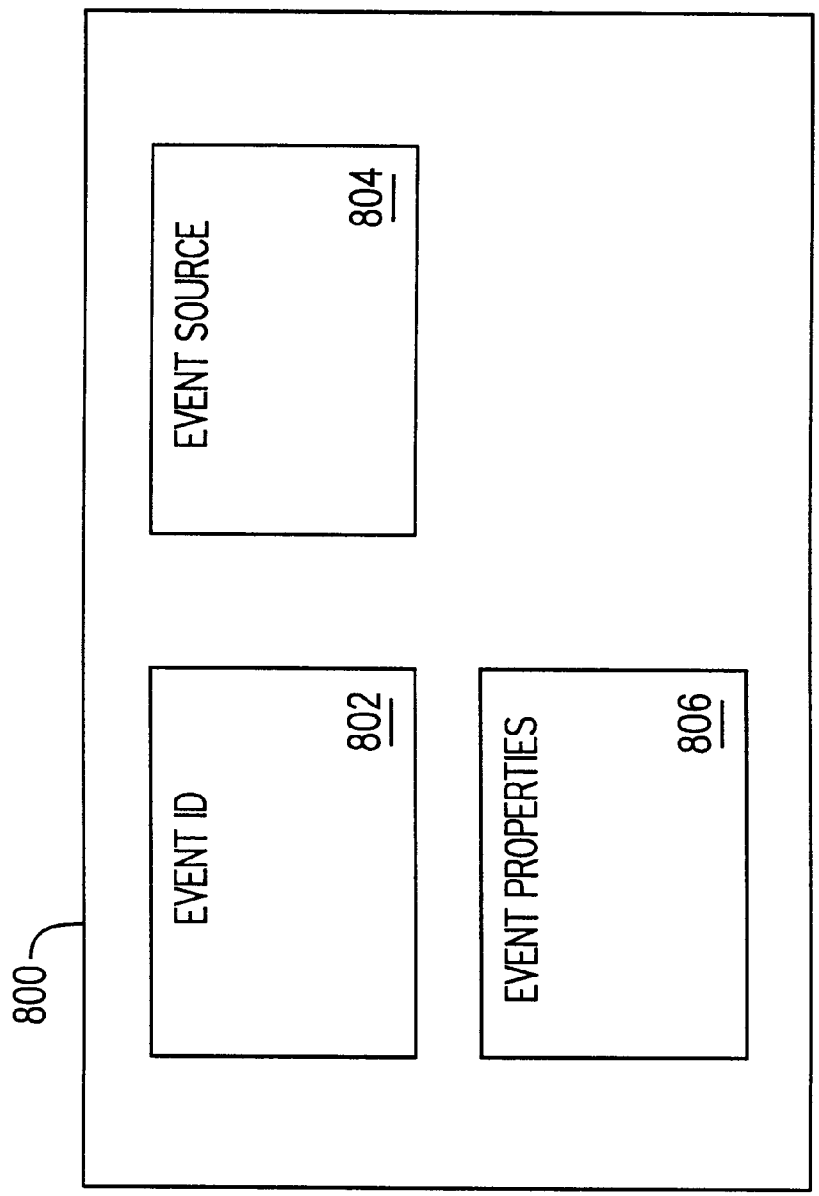
FIG. 8 is a block diagram of an event message module according to the present invention.

FIG. 8 is a block diagram of one embodiment of an event notification or message 800. The event message 800 is a data structure that represents the occurrence of a management event in the collection of managed devices 104 that are being managed by the management server 102. Events and corresponding event messages may also be generated by the client system 106, such as by using the web browser 107 or the like. Internal events may also be generated within the management server 102, such as by any of the constructions 302.

An event message 800 therefore indicates that a management automation event or "an event" has occurred and may cause an operation to be performed. Events as described herein are different than SNMP traps, although SNMP traps may cause management automation events to occur. The event message 800 contains an Event IDentifier (Event ID) 802 that uniquely identifies the type of event and an event creator or source 804 that specifies the entity that created the event message 800. The Event ID 802 of the event message 800 is used when "registering" to receive events. Optionally, the event message 800 may include properties 806 specific to the type of event. The properties 806 serve as information that the receiver of the event message 800 needs to perform its function. All events typically flow through the interconnect engine 212. The interconnect engine 212 is responsible for delivering event messages 800 to entities, such as constructions, that have registered to receive events. Examples of events that can be generated include but are not limited to: events sent to initiate execution of other constructions, timers, hardware faults, software configuration changes, software out of date, device status change, new device found, create device group, perform backup, etc. It is noted that the automation engine events are a mechanism for initiating execution of other constructions to accomplish some processing requirement. As such, the events in this context may not map one to one to a specific external event such as a hardware fault.

Besides being identified by a particular Event ID 802, event message 800 can also be grouped together into categories. This allows listeners (or constructions) to listen in on a range of events without having to know all of the Event IDs within the category. The event category is not a property of the event but instead is established by registering with the interconnect engine 212 and establishing the categories that the event should be within.

Figure 9:
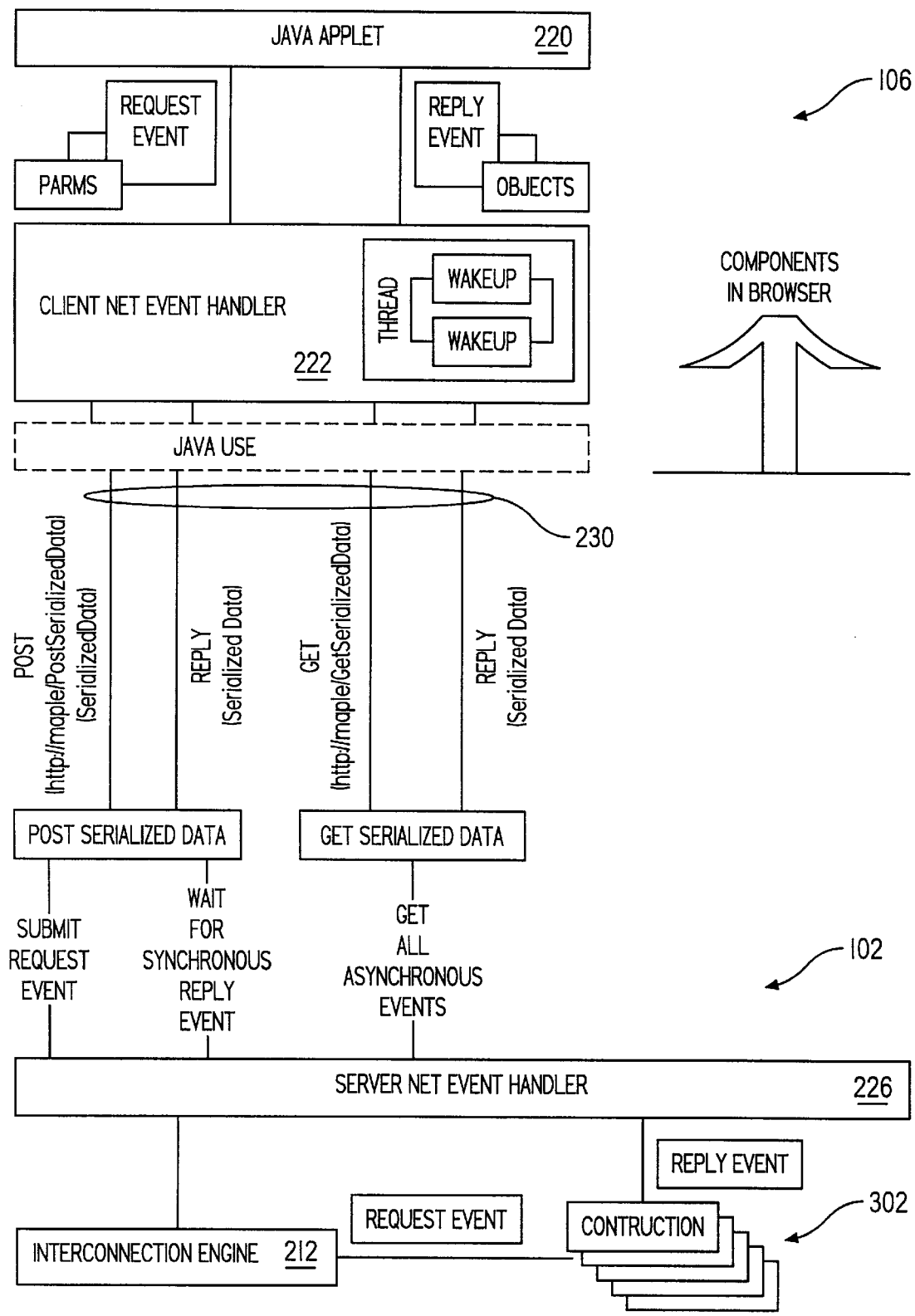
FIG. 9 is a block diagram of communication aspects of a client system and a management server for communicating an event request and an event reply according to the present invention using a Java applet.

FIG. 9 is a block diagram illustrating an event request and reply for a Java applet 220 running on the web server 107 of the client system 106 according to the present invention. The Java applet 220 requests an event message to be sent to the management server 102 for processing and then receives a response to the request. The communication used is preferably the normal client-server relationship of the client system 106 to the management server 102. For example, HTTP POST and HTTP GET operations may be used for the communication. If the applet 220 running on the client system 106 decides to send an event message to the management server 102, it creates an instance of a Java object NetAutomationEventRequest (See Appendix A) that contains parameters that describe an event request message. The parameters are commonly categorized as follows: the request type (synchronous or asynchronous); the reply data (object serialized form or HTML); an Event ID; a session identifier; and a maximum wait time for a synchronous request.

The NetAutomationEventRequest object instance is passed to the Client Net Event Handler (CNEH) 222 via a static Java application programming interface (API). The CNEH 222 submits the serialized event object to the management server 102 by means of an HTTP POST operation. The CNEH 222 passes the event object to the SNEH 226. The SNEH 226 adds a session identifier to the event request, which identifies the client system 106 that submitted the request. The session identifier is assigned by the management server 102 when the client system 106 successfully logs-in to the management server 102, and is maintained on the client system 106 as a parameter in a browser cookie. In this case, the session identifier is used to route a reply to the request back to the client system 106 from which it originated. If the Event Request is marked as synchronous, the SNEH 226 will not immediately produce a reply to the HTTP POST. Instead it blocks until the Request Event has produced a Reply Event.

The Request Event is routed by the SNEH 226 to the interconnect engine 212, which passes the Request Event to one or more constructions 302 that have registered as a listener of the Request Event. After one or more constructions are executed under control of the interconnect engine 212, a Reply Event is generated and provided to the SNEH 226. When the Reply Event is received by the SNEH 226, it returns the serialized Reply Event as the reply to the HTTP POST that submitted the corresponding Request Event. If the Request Event is marked as asynchronous, the SNEH 226 immediately responds and completes the HTTP POST transaction. This response contains no data since the event has not yet been processed.

The SNEH 226 registers as an event forwarder, so that it receives events for which no listener has registered for that specific event. Once the SNEH 226 receives an event from the AE 210, it checks to see if the event it has received is a Net Event. A Net Event is an event that is associated with a device, such as a managed device or the client system 106, that is external to the management server 102 and received via the network link 230. If the event is not a Net Event and no one is otherwise registered to listen to that event, then it is discarded. If it is a Net Event that is marked asynchronous, the SNEH 226 stores it with other Reply Events that are waiting to be returned to that same session identifier.

The return of a Reply Event to the applet 220 involves a thread that runs in the CNEH 222. This thread periodically issues an HTTP GET transaction to poll for one or more Reply Event(s). When the HTTP GET is received and processed by the management server 102, it calls SNEH 226 to determine if a Reply Event exists for the session identifier. If there are no Reply Events for that session identifier, then the HTTP server 224 responds with no data. If a Reply Event is available, it is returned in the reply to the HTTP GET operation. When a reply to an HTTP GET is received from the management server 102 with that same session identifier, all of the Reply Events are preferably concatenated into a single HTTP entity body and returned to the CNEH 222. When the CNEH 222 receives the reply, it returns it to the applet 220. If the Reply Event is marked as synchronous, the SNEH 226 returns the Reply Event as a reply to the original HTTP POST operation.

It is noted that the Java Applet 220 in the client system 106 can initiate events for processing by a remote server and receive the results of the event processing with location transparency and that all communications may be implemented using standard HTTP/client system 106 to management server 102 protocol transactions. This permits use of this method through HTTP proxy servers and firewalls. Appendix A includes examples of three Java objects that are used in relation to Java applet 220. The objects are referred to, respectively, as NetAutomationEvent, NetAutomationEventRequest, and NetAutomationEventReply, and correspond to a management event, a request event, and a reply event, respectively.

In accordance with the present invention, the disadvantages of the prior art have been overcome through the implementation of a programmable event driven management processing system that invokes an automation engine in association with an interconnect engine and an active construction store. A construction editor is provided for building constructions across a network from remote or central locations. The construction editor allows a user to build the constructions using basic component functional building blocks including standard and/or customized parameters of interest to the user and to make those constructions available to the automation engine. Each construction performs a desired management operation in response to a management automation event. In this manner, network management is accomplished in a flexible manner that allows programmability of network management from a web browser or the like. Management events are created and monitored through the system according to the present invention.

The above-listed sections and included information are not exhaustive and are only exemplary for computer systems. The particular sections and included information in a particular embodiment may depend upon the particular implementation and the included devices and resources. Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

Appendix A

```
/*------------------------------------------------------------------------
---- Copyright 1997 Compaq Computer Corporation
------------------------------------------------------------------------
----
---- Title: NetAutomationEvent.java
----
---- Description: NetAutomatioEvent enables the event to be serialized and
----       and interchanged between two machines. This is the super
----       class for any events that needs to be exchanged between
----       two nodes.
----
```

Appendix A-continued

```
package compaq.Automation;
import java.io.ObjectInputStream;
import java.io.ObjectOutputStream;
import java.io.Serializable;
import java.io.IOException;
import java.util.*;
import compaq.Automation.GenericEvent;
import compaq.Security.UserSession;
import compaq.Utility.DebugOutput;
/**
 * The <code>NetAutomationEvent</code> enables the event to be serialized
 * and interchanged between two machines. This class provides the basis
 * for submitting requesting and receiving replies from the
 * Management Automation Engine.
 * <p>
 * The <code>NetAutomationEvent</code> class must be the superclass of any
 * event that is to be serialized and interchanged.
 *
 * @see
 * @since   JDK1.1.2
 */
public abstract class NetAutomationEvent extends GenericEvent //implements
NetSerializable
{
    /**
     * Private properties - available only to this class
     */
//    private Serializable ParameterSet;
    /**
     * Protected properties - available to my subclasses and classes that are in same package
     */
    protected transient UserSession Session;
    /**
     * When was this event created?
     */
    public Date creationTime;
    int ObjectVersion = 1;
    /**
     * The constructor with complete argument set to initialize this object.
     *
     * @param source the originating object of this event. Since this is a "transient"
     * object, in the destination node, this will reference the proxy object that is
     * forwading this event. In the orginating node, it may reference the actual source
     * object that is generating this event.
     * @param param the serializable properties associated with this event
     * @param session the session information associated with this event
     * @param messageId the name of the event that is being fired
     * @see compaq.Automation.GenericEvent
     */
public NetAutomationEvent (Object source,
                    Serializable param,
                    UserSession session,
                    String messageId)
    {
        super (source,messageId,param);
        creationTime = new Date( );
        this.Session = session;
//        this.ParameterSet = param;
    }
    /**
     * The constructor with complete argument set to initialize this object.
     *
     * @param source the originating object of this event. Since this is a "transient"
     * object, in the destination node, this will reference the proxy object that is
     * forwading this event. In the orginating node, it may reference the actual source
     * object that is generating this event.
@param param the serializable properties associated with this event
     * @param session the session information associated with this event
     * @param eventId the id of the event that is being fired
     * @see compaq.Automation.GenericEvent
     */
public NetAutomationEvent (Object source,
                    Serializable param,
                    UserSession session,
                    int eventId)
    {
        super (source,eventId,param);
        creationTime = new Date( );
```

Appendix A-continued

```
            this.Session = session;
//      this.ParameterSet = param;
        }
        /**
        * Allows the session property to be set.
        *
        * @param session object that contains session information
        * @return
        * @exception
        * @see
        */
        public void setSession (UserSession session)
        {
            this.Session = session;
        }
/**
        * Allows the session property to be obtained.
        *
        * @param
        * @return returns the <code>UserSession</code> object
        * @exception
        * @see
        */
        public UserSession getSession ( )
        {
            return this.Session;
        }
        /**
        * Allows the parameter set associated with this event to be obtained.
        *
        * @param
        * @return returns the <code>Serializable</code> object that contains the parameter set
        * @exception
        * @see
        */
        public Serializable getParameterSet ( )
        {
            return (Serializable)getData( );
        }
/**
        * Allows the parameter set of the event to be set.
        *
        * @param param a <code>Serializable</code> object that contains the parameter set
        * @return
        * @exception
        * @see
        */
        public void setParameterSet (Serializable param)
        {
            setData(param);
        }
        /**
        * An override of writeObject of<code>Serializable</code> interface so that
        * the write for this event can be customized.
        *
        * @param out identifies <code>ObjectOutputStream</code> to be used for the write
        * @return
        * @exception
        * @see
        */
        //public void writeObject (ObjectOutputStream out) throws IOException
        //{
        //      out.defaultWriteObject( );
        //}
        /**
        * An override of readObject of <code>Serializable</code> interface so that
        * the read for this event can be customized.
        *
        * @param in identifies <code>ObjectInputStream<code> to be used for the read
        * @return returns the event object that was read
        * @exception
        * @see
        */
//public Object readObject (ObjectInputStream in)
//          throws IOException, ClassNotFoundException
        //{
        //      in.defaultReadObject( );
        //}
        /**
```

Appendix A-continued

```
        * writeObject
        */
/*
    public void writeObject (ObjectOutputStream out) throws IOException
    {
        out.writeObject((Serializable)getData( ));
    }
    public Object readObject (ObjectInputStream in)
            throws IOException
    {
      try
        {
          setData((Serializable) in.readObject( ));
        }
        catch(ClassNotFoundException cnfe)
        {
        }
        return this;
    }
*/
    public int getObjectVersion ( )
    {
        return this.ObjectVersion;
    }
    public void setObjectVersion (int version)
    {
        ObjectVersion = version;
    }
}
/*-------------------------------------------------------------------
---- Copyright 1997 Compaq Computer Corporation
-------------------------------------------------------------------
----
---- Title: NetAutomationEventReply.java
----
---- Description:   NetAutomatioEventReply is the response to a
----               NetAutomationEventRequest.
-------------------------------------------------------------*/
package compaq.Automation;
import java.io.ObjectInputStream;
import java.io.ObjectOutputStream;
import java.io.Serializable;
import java.io.IOException;
import compaq.Security.UserSession;
import compaq.Utility.DebugOutput;
/**
* The <code>NetAutomationEventReply</code> is generated in response to a
* <code>NetAutomationEventRequest</code>. This class is derived from
* <code>NetAutomationEvent</code> which enables the event to be
serialized
* and interchanged between two machines.
* <p>
* The <code>NetAutomationEventReply</code> class must be the superclass
of any
* reply event that is generated in response to a
<code>NetAutomationEventRequest</code>.
*
* @see
* @since     JDK1.1.2
*/
public class NetAutomationEventReply extends NetAutomationEvent
{
    /**
     * Private properties
     */
    private NetAutomationEventRequest RequestingEvent;
    private Exception error;
    /**
     * The constructor with complete argument set to initialize this reply
event object.
     *
     * @param source indicates the originating object for this event. Since
this object
     * is a "transient" property, it is communicated between originating
and destination
     * nodes. In the destination node, this will reference the proxy object
that is
     * forwading this reply event. In the orginating node, it may
reference the actual
```

Appendix A-continued

```
    * source object that is generating this event.
    * @param ParamaterSet the serializable properties associated with
this event
    * @param RequestingEvent associated request event for this reply
    * @param error exception generated if any
    * @return
    * @exception
    * @see    compaq.netsupport.NetAutomationEvent
    */
    public NetAutomationEventReply (Object source,
                                    int EventID,
                                    Serializable ParameterSet,
                                    NetAutomationEventRequest RequestingEvent,
                                    Exception error) throws
NullPointerException
    {
        super (source, ParameterSet,
RequestingEvent.getSession( ),EventID);
        //if (!(RequestingEvent instance of Serializable))
        //    throw new IllegalArgumentException("Bad RequestingEvent
Argument");
        this.RequestingEvent=RequestingEvent;
        this.error=error;
    }
    public NetAutomationEventReply(Object source, int eventId,
                                    Serializable ParameterSet,
                                    UserSession requestSession,
                                    Exception error)
        throws NullPointerException
    {
        super(source,ParameterSet,requestSession,eventId);
        this.RequestingEvent = null;
        this.error = error;
    }
    public NetAutomationEventReply(Object source, String messageId,
                                    Serializable ParameterSet,
                                    NetAutomationEventRequest
RequestingEvent,
                                    Exception error)
        throws NullPointerException
    {
        super(source,ParameterSet,RequestingEvent.getSession( ),messageId);
        this.RequestingEvent = RequestingEvent;
        this.error = error;
    }
    public NetAutomationEventReply(Object source,String messageId,
                                    Serializable ParameterSet,
                                    UserSession requestSession,
                                    Exception error)
        throws NullPointerException
    {
        super(source,ParameterSet,requestSession,messageId);
        this.RequestingEvent = null;
        this.error = error;
    }
    /**
    * Allows the requesting event property to be set.
    *
    * @param request object that contains the requesting event
    * @return
    * @exception
    * @see
    */
    protected void setRequestingEvent (NetAutomationEventRequest request)
    {
        this.RequestingEvent = request;
    }
    /**
    * Allows the requesting event property to be obtained.
    *
    * @param
    * @return returns the requesting event associated with this event
    * @exception
    * @see
    */
    public NetAutomationEventRequest getRequestingEvent ( )
    {
        return this.RequestingEvent;
    }
```

Appendix A-continued

```
/*
        public void writeObject (NetOutputStream out) throws IOException
    {
        super.writeObject(out);
        out.writeIntToken(EventID);
        out.writeObject(RequestingEvent);
        if (this.error != null)
        {
            out.writeIntToken(1);
            out.writeStringToken(this.error.getMessage( ));
        }
        else
        {
            out.writeIntToken(0);
        }
    }
    public Object readObject (NetInputStream in)
                throws IOException
    {
        super.readObject(in)
        EventID = in.readIntToken( );
        RequestingEvent = (NetAutomationEventRequest) in.readObject( );
        if (in.readIntToken( ) == 1)
        {
            this.error = new Exception(in.readStringToken( ));
        }
        else
        {
            this.error = null;
            }
            return this;
    }
*/
}
/*------------------------------------------------------------------
---- Copyright 1997 Compaq Computer Corporation
------------------------------------------------------------------
----
---- Title: NetAutomationEventRequest.java
----
---- Description:    NetAutomatioEventRequest is the supr class for any event
----                 requests in a rqust-reply protcl NetAutomationEventReply
----                 must be used for the reply.
------------------------------------------------------------------*/
package compaq.Automation;
import java.io.ObjectInputStream;
import java.io.ObjectOutputStream;
import java.io.Serializable;
import java.io.IOException;
import java.io.EOFException;
import compaq.Automation.AutomationEvent;
import compaq.Security.UserSession;
/**
* The <code>NetAutomationEventRequest</code> is the super class for any
* request event. This class is derived from
<code>NetAutomationEvent</code>
* whic enables the event to be serialized and interchanged between two
machines.
* The <code>NetAutomationEventRequest</code> provides the basis for
submitting request
* and the <code>NetAutomationEventReply</code> provides the basis for
replies from the
* Mangement Automation Engine.
*
* @see
* @since     JDK1.1.2
*/
public class NetAutomationEventRequest extends NetAutomationEvent
{
    /**
    * An event type of REQUEST_SYNCHRONOUS value indicates this
    * event is a request that needs a reply synchronously.
    */
    public final static int REQUEST_SYNCHRONOUS = 101;
    /**
    * An event type of REQUEST_ASYNCHRONOUS value indicates that this is
an
    * atomic request. A reply may or may not be produced in response to
    * this request.
```

Appendix A-continued

```
    */
    public final static int REQUEST_ASYNCHRONOUS = 102;
    /**
    * A reply data form of REPLYDATA_SERIALIZED indicates the reply that
is to
    * be generated for this request must be in object serialized form.
    */
    public final static int REPLYDATA_SERIALIZED = 1001;
    /**
    * A reply data form of REPLYDATA_HTML indicates the reply that is to
be
    * be generated for this request must be in HTML form.
    */
    public final static int REPLYDATA_HTML = 1002;
    /**
    * Private properties
    */
    private int RequestType;      // REQUEST_SYNCHRONOUS or
REQUEST_ASYNCHRONOUS
    private int ReplyDataForm;  // REPLYDATA_SERIALIZED or REPLYDATA_HTML
    private int maxWaitTime;    // maximum time to wait for a Synchronous
request
    private final static int DEFAULT_MAXWAITTIME = 10000;
    /**
    * The constructor with complete argument set to initialize this
object.
    *
    * @param source the originating object of this event. Since this is a
"transient"
    * object, in the destination node, this will reference the proxy
object that is
    * forwading this event. In the orginating node, it may reference the
actual source
    * object that is generating this event.
    * @param param the serializable properties associated with this event
    * @param session the session information associated with this event
    * @param requestType the type of event: REQUEST_SYNCHRONOUS or
REQUEST_ASYNCHRONOUS
    * @param replyDataForm the type reply data: REPLYDATA_SERIALIZED or
REPLYDATA_HTML
    * @return
    * @exception
    * @see   compaq.Automation.AutomationEvent
    */
    public NetAutomationEventRequest (Object source,
                               int EventID,
                               Serializable param,
                               UserSession session,
                               int requestType,
                               int replyDataForm,
                               int maxWaitTime)
                          throws IllegalArgumentException
    {
        super (source, param, session,EventID);
        this.RequestType = requestType;
        this.ReplyDataForm = replyDataForm;
        if (maxWaitTime == 0)
            this.maxWaitTime = DEFAULT_MAXWAITTIME;
        else
            this.maxWaitTime = maxWaitTime;
    }
    public NetAutomationEventRequest (Object source,
                               int EventID,
                               Serializable param,
                               UserSession session,
                               int requestType,
                               int replyDataForm)
                          throws IllegalArgumentException
    {
        super (source, param, session,EventID);
        this.RequestType = requestType;
        this.ReplyDataForm = replyDataForm;
        this.maxWaitTime = DEFAULT_MAXWAITTIME;
    }
    public NetAutomationEventRequest (Object source,
                               int EventID,
                               Serializable param,
                               int requestType,
                               int replyDataForm)
```

Appendix A-continued

```
                            throws IllegalArgumentException
    {
        super (source, param, null,EventID)
        this.RequestType = requestType;
        this.ReplyDataForm = replyDataForm;
        this.maxWaitTime = DEFAULT_MAXWAITTIME;
    }
    public NetAutomationEventRequest (Object source,
                                int EventID,
                                Serializable param)
                            throws IllegalArgumentException
    {
        super (source, param, null,EventID);
        this.RequestType = REQUEST_ASYNCHRONOUS;
        this.ReplyDataForm = REPLYDATA_SERIALIZED;
        this.maxWaitTime = DEFAULT_MAXWAITTIME;
    }
//--------------------------------------
    public NetAutomationEventRequest (Object source,
                                String messageId,
                                Serializable param,
                                UserSession session,
                                int requestType,
                                int replyDataForm,
                                int maxWaitTime)
                            throws IllegalArgumentException
    {
        super (source, param, session,messageId);
        this.RequestType = requestType;
        this.ReplyDataForm = replyDataForm;
        if (maxWaitTime == 0)
            this.maxWaitTime = DEFAULT_MAXWAITTIME;
        else
            this.maxWaitTime = maxWaitTime;
    }
    public NetAutomationEventRequest (Object source,
                                String messageId,
                                Serializable param,
                                UserSession session,
                                int requestType,
                                int replyDataForm)
                            throws IllegalArgumentException
    {
        super (source, param, session,messageId)
        this.RequestType = requestType;
        this.ReplyDataForm = replyDataForm;
        this.maxWaitTime = DEFAULT_MAXWAITTIME;
    }
    public NetAutomationEventRequest (Object source,
                                String messageId,
                                Serializable param,
                                int requestType,
                                int replyDataForm)
                            throws IllegalArgumentException
    {
        super (source, param, null,messageId);
        this.RequestType = requestType;
        this.ReplyDataForm = replyDataForm;
        this.maxWaitTime = DEFAULT_MAXWAITTIME;
    }
    public NetAutomationEventRequest (Object source,
                                String messageId,
                                Serializable param)
                            throws IllegalArgumentException
    {
        super (source, param, null,messageId);
        this.RequestType = REQUEST_ASYNCHRONOUS;
        this.ReplyDataForm = REPLYDATA_SERIALIZED;
        this.maxWaitTime = DEFAULT_MAXWAITTIME;
    }
    /**
    * Allows the RequestType property to be set
    *
    * @param RequestType with either REQUEST_SYNCHRONOUS or
REQUEST_ASYNCHRONOUS
    * @return
    * @exception
    * @see
    */
```

Appendix A-continued

```
    void setRequestType (int RequestType)
    {
        this.RequestType = RequestType;
    }
    /**
    * Allows the request type to be obtained.
    *
    * @param
    * @return returns the request type: either REQUEST_SYNCHRONOUS or
REQUEST_ASYNCHRONOUS
    * @exception
    * @see
    */
    public int getRequestType ( )
    {
        return this.RequestType;
    }
    /**
    * Allows the reply data form to be set.
    *
    * @param ReplyDataForm either REPLYDATA_SERIALIZED or REPLYDATA_HTML
    * @return
    * @exception
    * @see
    */
    public void setReplyDataForm (int ReplyDataForm)
    {
        this.ReplyDataForm = ReplyDataForm;
    }
    /**
    * Allows the reply data form to be obtained.
    *
    * @param
    * @return returns either REPLYDATA_SERIALIZED or REPLYDATA_HTML
    * @exception
    * @see
    */
    public int getReplyDataForm( )
    {
        return this.ReplyDataForm;
    }
    public int getMaxWaitTime( )
    {
        return this.maxWaitTime;
    }
    public void setMaxWaitTime (int maxWaitTime)
    {
        this.maxWaitTime = maxWaitTime;
    }
/*
    public void writeObject (NetOutputStream out) throws IOException,
EOFException
    {
        super.writeObject (out);
        out.writeIntToken (EventID);
        out.writeIntToken (RequestType);
        out.writeIntToken (ReplyDataForm);
        out.writeIntToken(maxWaitTime);
    }
    public Object readObject (NetInputStream in)
                   throws IOException
    {
        super.readObject(in);
        EventID = in.readIntToken( );
        RequestType = in.readIntToken( );
        ReplyDataForm = in.readIntToken( );
        maxWaitTime = in.readIntToken( );
        return this;
    }
*/
}
/*------------------------------------------------------------------
---- Copyright 1997 Compaq Computer Corporation
------------------------------------------------------------------
----
---- Title: AutomationEvent.java.java
----
---- Package: compaq.Automation
----
```

Appendix A-continued

```
---- Description:   This class represents the base class for all events that
----                participate in Management Automation
----
--------------------------------------------------------------------*/
package compaq.Automation;
import java.util.*;
/**
* <p>
* The compaq.AutomationEvent object is the base class for all events that are
* generated by components within the Management compaq.Automation subsystem.
* All events must be derived from this class so the compaq.Automation Engine can
* forward the event
* </p>
*/
public abstract class AutomationEvent extends EventObject
{
    Object target;
    Object waitElement;
    boolean waitOnResponse;
    public AutomationEvent (Object source)
    {
        super(source);
        target=null;
        waitOnResponse=false;
    }
    public AutomationEvent (Object source,Object target)
    {
        this (source)
        this.target=target;
    }
    public Object getTarget( )
    {
        return target;
    }
    public void setTarget(Object target)
    {
        this.target=target;
    }
    /**
    * This function is used by an object to setup this event to be
    * a response to another event.
    *
    * @param event the event that this event is a response to
    */
    public void responseTo(AutomationEvent e)
    {
        waitElement=e.getWaitElement( );
        if (waitElement!=null)
            {
            waitOnResponse=true;
            }
    }
    /**
    * This function and the setWaitElement function serve as the interface
    * to use when you want to have two way event communication
    *
    * @return the object that is waiting on a response from the person handling
    * this event
    */
    protected Object getWaitElement( )
    {
        return waitElement;
    }
    protected void setWaitElement(Object w)
    {
        waitElement=w;
    }
    protected boolean getWaitOnResponse( )
    {
        return waitOnResponse;
    }
    /**
    * This function will return the Event ID for this event. This function must be overridden in
```

Appendix A-continued

```
     * derived classes and must return a unique id for their event.
     *
     * @return this events eventId
     *
     */
    public abstract int getEventId( );
}
/*-------------------------------------------------------------------
---- Copyright 1997 Compaq Computer Corporation
-------------------------------------------------------------------
----
---- Title: GenericEvent.java
----
---- Package: compaq.Automation
----
---- Description:
----
-------------------------------------------------------------------*/
package compaq.Automation;
/**
* This class allows for the creation of GenericEvent's that have an Event
ID
* and can have generic data associated with them
*/
public class GenericEvent extends AutomationEvent
{
    int msgId;
    Object data;
    public GenericEvent(Object source,int messageId)
    {
        super(source);
        msgId=messageId;
    }
    public GenericEvent(Object source,Object target,int messageId)
    {
        super(source, target);
        msgId=messageId;
    }
    public GenericEvent(Object source,String messageId)
    {
        super(source);
        setMessageId(messageId);
    }
    public GenericEvent(Object source,Object target,String messageId)
    {
        super(source, target);
        setMessageId(messageId);
    }
    public GenericEvent(Object source,int messageId,Object data)
    {
        super(source);
        msgId=messageId;
        this.data=data;
    }
    public GenericEvent(Object source,Object target, int messageId,Object
data)
    {
        super(source, target);
        msgId=messageId;
        this.data=data;
    }
    public GenericEvent(Object source,String messageId,Object data)
    {
        super(source)
        setMessageId(messageId);
        this.data=data;
    }
    public GenericEvent(Object source,Object target,String
messageId,Object data)
    {
        super(source,target);
        setMessageId(messageId);
        this.data=data;
    }
    private final void setMessageId(String messageId)
    {
        try
            {
            msgId=Message.getMessageId(messageId);
```

Appendix A-continued

```
            }
            catch(IllegalStateException ise)
                {
                    msgId=0;
                }
        }
        public int getEventId( )
        {
            return msgId;
        }
        public Object getData( )
        {
            return data;
        }
        public void setData(Object dat)
        {
            data=dat;
        }
}
/*------------------------------------------------------------------
---- Copyright 1997 Compaq Computer Corporation
------------------------------------------------------------------
----
---- Title: GenericMessageListener.java
----
---- Package: compaq.Automation
----
---- Description:
----
------------------------------------------------------------------*/
package compaq Automation.components;
import compaq.Automation.*;
public class GenericMessageListener extends ManagementAutomatableAdapter
                                    implements AutomationListener
{
    static final long serialVersionUID = 3261784115969580728L;
    int msgId;
    String messageId;
    transient AutomationEvent event;
    public GenericMessageListener( )
    {
    }
    public String ComponentName( )
    {
        return new String("GenericMessageListener");
    }
    public AutomationEvent getEvent( )
    {
        return event;
    }
    public Object getEventData( )
    {
        return ((GenericEvent)event).getData( );
    }
    public void setMessageId(String id)
    {
        messageId=id;
    }
    public String getMessageId( )
    {
        return messageId;
    }
    public void setEventId(int id)
    {
        if(id!=0)
            msgId=id;
    }
    public int getEventId( )
    {
        return msgId;
    }
    /**
    * This function is called by the construction when we are being
unloaded.
    * We unregister ourselves as an event listener for the initialization
event
    */
    public void destroy( )
    {
```

Appendix A-continued

```
    }
/**
 * This function is called by the automation engine when we are
supposed
 * to do our work.
 *
 * @param comingFromPath the state of the construction we are being
called from
 * @return
 */
    public boolean determineOutputState (boolean comingFromPath)
    {
        return true;
    }
/**
 * This function is where we tell the construction which event we are
interested in
 */
    public void registerEvents( )
    {
        if (msgId!=0)
            {
            addEventSink(this,msgId);
            return;
            }
        msgId=0;
        // get the int message id given the string message id
        if (messageId==null)
            return;
        try
            {
            msgId=Message.getMessageId(messageId);
            // tell the construction which event we want to receive
            addEventSink(this,msgId);
            }
        catch(IllegalStateException ise)
            {
            }
    }
    public void deRegisterEvents( )
    {
        removeEventSink(this,msgId);
    }
    public void eventOccurred(AutomationEvent e)
    {
        event=e;
    }
}
```

What is claimed is:

1. A management server for coupling to a network that facilitates and performs programmable event driven processing, comprising:

event detection logic, for coupling to the network, that receives any of a plurality of event notifications transmitted via the network, each event notification corresponding to the occurrence of at least one of a plurality of management events, and that supports registration of at least one listener of any of the plurality of management events;

a plurality of executable components that each perform a basic function;

a construction editor that enables access of the plurality of executable components to generate at least one construction including at least one instance of the plurality of executable components, that facilitates defining a relationship between instances of executable components comprising the at least one construction;

the at least one construction, when invoked, executing the at least one instance of the plurality of executable components to perform at least one desired operation in response to the occurrence of the at least one of the plurality of management events; and the event detection logic receiving an event notification corresponding to the at least one of the plurality of management events and invoking the at least one construction.

2. The management server of claim 1, further comprising:

the at least one construction comprising a plurality of constructions, each registered with the event detection logic as a listener of at least one of the plurality of management events.

3. The management server of claim 2, the event detection logic further comprising:

interconnection logic that enables registration of internal and external events including the plurality of management events;

the plurality of constructions including a first construction that generates an internal event when invoked;

the plurality of constructions including a second construction registered with the interconnection logic as a listener of the internal event generated by the first construction; and the interconnection logic invoking the second construction in response to the internal event generated by the first construction.

4. The management server of claim 1, the at least one construction comprising:

the at least one construction including at least two instances of the plurality of executable components;

interconnection data that incorporates a relationship between the at least two instances of the plurality of executable components; and a dispatcher that facilitates execution of the at least two instances of the plurality of executable components according to the interconnection data.

5. The management server of claim 4, the at least two instances of the plurality of executable components further comprising:

a first executable component that generates a boolean result;

a second executable component;

a third executable component; and the dispatcher selecting one of the second and third executable components to be executed after executing the first executable component based on the boolean result.

6. The management server of claim 5, further comprising:

the first executable component generating at least one output parameter;

the second executable component receiving at least one input parameter;

the third executable component receiving at least one input parameter; and the dispatcher further copying the at least one output parameter of the first executable component to the at least one input parameter of the selected one of the second and third executable components.

7. The management server of claim 1, the at least one construction further comprising:

an event listener proxy;

the at least one instance of the plurality of executable components including an event listener component that registers with the event listener proxy as a listener to the at least one event; and the event listener proxy registering with the event detection logic as a listener of the at least one event.

8. The management server of claim 1, the construction editor comprising an interactive tool to enable a user to interactively retrieve instances of any of the plurality of executable components and to define interconnections and relationships between the retrieved instances of the plurality of executable components.

9. The management server of claim 1, each of the plurality of event notifications comprising a message, for transmission via the network, that includes an Event IDentifier and event properties.

10. The management server of claim 1, the event detection logic comprising:

interconnection logic;

a server interface that interfaces with the network according to Transmission Control Protocol/Internet Protocol (TCP/IP); and an event handler, coupled to the server interface and the interconnection logic, that routes event notifications received by the server interface to the interconnection logic.

11. A management system for a network, comprising:

at least one managed device, for coupling to the network, that detects occurrence of any one of a plurality of management events occurring on the at least one managed device and that transmits one of a corresponding plurality of event notifications via the network; and a management server, for coupling to the network, comprising:

event detection logic, for coupling to the network, that receives any of the plurality of event notifications transmitted via the network and that supports registration of at least one listener of any of the plurality of management events;

a plurality of executable components that each perform a basic function;

a construction editor that enables access of the plurality of executable components, that facilitates defining a relationship between instances of executable components comprising the at least one construction, and that performs registration of the at least one construction with the event detection logic as a listener of at least one of the plurality of management events;

the at least one construction, when invoked, executing the at least one instance of the plurality of executable components to perform at least one desired operation in response to the occurrence of the at least one management event; and the event detection logic receiving an event notification corresponding to the at least one management event and invoking the at least one construction.

12. The management system of claim 11, further comprising:

the at least one construction comprising a plurality of constructions, each registered with the event detection logic as a listener of a corresponding one of the plurality of management events.

13. The management system of claim 11, each of the plurality of event notifications comprising a message, for transmission via the network, that includes an Event IDentifier and event properties.

14. The management system of claim 11, the event detection logic comprising:

interconnection logic;

a server interface for interfacing with the network; and a server event handler, coupled to the server interface and the interconnection logic, that routes event notifications received by the server interface to the interconnection logic.

15. The management system of claim 14, further comprising:

a client system, for coupling to the network, that generates a request event;

the at least one construction being registered with the interconnect logic to listen for the request event and generating a reply event in response to the request event; and the server event handler receiving and routing the request event to the interconnect logic and receiving and transmitting the reply event to the client system via the server interface.

16. The management system of claim 15, further comprising:

the client system logging onto the management server and receiving a session identifier, wherein the client system includes the session identifier in the request event; and the management server providing the client system the session identifier, and the server interface uses the session identifier in the request event to respond to the client system when transmitting the reply event.

17. The management system of claim 15, further comprising:

the client system and the server interface of the management server operating according to Transmission Control Protocol/Internet Protocol (TCP/IP);

the client system transmitting the request event to the management server as a hypertext transmit protocol (HTTP) post transaction; and the server interface submitting the reply event as a response to the HTTP post transaction.

18. The management system of claim 15, further comprising:

the client system transmitting the request event to the management server as an initial transaction and then periodically transmitting a query to the management server to poll for the reply event; and the server interface responding to the initial transaction and each query and eventually responding to the request event by providing the reply event in response to a query.

19. The management system of claim 18, further comprising:

the client system and the server interface of the management server operating according to TCP/IP;

the client system transmitting the request event to the management server as a hypertext transmit protocol (HTTP) post transaction and transmitting each query as an HTTP get transaction; and the server interface submitting the reply event as a response to a last HTTP get transaction.

* * * * *